US008849270B2

(12) United States Patent
Taglienti et al.

(10) Patent No.: US 8,849,270 B2
(45) Date of Patent: Sep. 30, 2014

(54) SYSTEM AND METHOD FOR PROVIDING GEOGRAPHIC REDUNDANCY FOR MOBILE WIRELESS DATA NETWORK COMPONENTS

(75) Inventors: Claudio Taglienti, Barrington Hills, IL (US); Narothum Saxena, Hoffman Estates, IL (US); Michael Irizarry, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 20 days.

(21) Appl. No.: 13/548,870

(22) Filed: Jul. 13, 2012

(65) Prior Publication Data

US 2014/0018064 A1 Jan. 16, 2014

(51) Int. Cl.
*H04W 4/00* (2009.01)

(52) U.S. Cl.
USPC ............ 455/422.1; 455/445; 455/7; 455/270; 455/8; 370/354

(58) Field of Classification Search
CPC ...... H04W 48/17; H04W 8/082; H04L 69/40; H04L 49/552; H04Q 2213/13166; H04Q 2213/13167; H04Q 3/0029
USPC ........ 455/424, 445, 7, 422.1, 270, 8; 370/354
See application file for complete search history.

(56) References Cited

U.S. PATENT DOCUMENTS

| | | | | |
|---|---|---|---|---|
| 7,080,151 | B1* | 7/2006 | Borella et al. | 709/230 |
| 2007/0253328 | A1* | 11/2007 | Harper et al. | 370/219 |
| 2010/0075626 | A1* | 3/2010 | Titus et al. | 455/404.1 |
| 2011/0235505 | A1* | 9/2011 | Eswara et al. | 370/221 |

* cited by examiner

*Primary Examiner* — Charles Appiah
*Assistant Examiner* — Edward Zhang
(74) *Attorney, Agent, or Firm* — Leydig, Voit & Mayer, Ltd.

(57) ABSTRACT

A system includes redundantly configured resources designated as active geo-redundant nodes (AGNs) and standby geo-redundant nodes (SGNs), a set of covered agents (CAs) that rely upon the redundantly configured resources, and a geographic redundancy coverage issuer (GRCI) configured to manage the geo-redundant nodes. The GRCI maintains a CA list identifying a set of subscribers to redundancy management services supported by the GRCI, an AGN list identifying a set of active geo-redundant nodes, and an SGN list identifying a set of standby geo-redundant nodes. The GRCI provides the AGN list and the SGN list to subscriber CAs. In response to receiving a message identifying a failed AGN, the GRCI updates the AGN list to reflect a failed status for the failed AGN and issues an update message to CAs reflecting the failed status for the failed AGN and a transition of an activated SGN to the AGN list.

24 Claims, 5 Drawing Sheets

SYSTEM AND METHOD FOR PROVIDING GEOGRAPHIC REDUNDANCY FOR MOBILE WIRELESS DATA NETWORK COMPONENTS

FIELD OF THE INVENTION

This invention relates generally to the field of mobile wireless communications networks and associated services. More particularly, the invention is directed to mobile wireless data communication services (such as those supporting data flows to/from smart phones) in such networks, and more specifically to managing redundancy for components of mobile wireless data networks supporting data communications services.

BACKGROUND OF THE INVENTION

Proliferation of smart phones, and their subsequent use to perform high data-rate communication, has resulted in an exponential growth in the volume of data flowing over wireless networks. The increased volume of data flowing over the networks is taxing the service providers and the legacy network infrastructure responsible for ensuring the data reliably flows for most, if not all, users.

Furthermore, the introduction of a new generation of mobile wireless networks based upon fourth generation (4G) mobile wireless standards (e.g., "Long Term Evolution" or "LTE" and Mobile WiMAX) and associated communications infrastructure has indeed substantially increased the throughput capabilities of mobile wireless networks for users that subscribe to and use 4G services. Thus, 4G technology has the capability of relieving the stresses currently being experienced by 3G systems arising from the proliferation of mobile wireless devices (e.g., smart phones, tablet computers, etc.).

While 4G networks, which provide substantially superior data rates and overall bandwidth compared to previous generations, are likely to be adopted by most mobile wireless data service users in the coming years, until such time the mobile wireless data network service providers are faced with the unenviable task of supporting multiple sets of network infrastructures.

At least one troublesome aspect of mobile wireless data networks that is enhanced when multiple generations of mobile wireless data service network infrastructure are concurrently supported is the need to provide backup network communications servers. Backup network communications servers, operating a vast majority of the time in a standby mode, ensure coverage for a geographic region (i.e., geo-redundancy) in case any corresponding primary/active network server fails. However, maintaining a corresponding backup/standby node for each functional node on a mobile wireless network becomes very expensive. Mobile wireless network service providers not only make substantial expenditures for physical backup/standby servers and their associated software, they also must cover substantial ongoing costs since the machines running the standby nodes require air conditioned/controlled space, electricity, maintenance, and employees to configure and monitor the physical equipment.

Known approaches to providing geo-redundancy are often costly and/or of limited scope. One approach involves configuring/running a hot standby copy for a particular instance of an active network node (e.g., a home agent). In such redundancy configurations, the hot standby copy maintains state information on a real-time basis for every session maintained on a corresponding primary server.

SUMMARY OF THE INVENTION

Embodiments of the invention are used to provide a system and method for managing geo-redundant configured resources of a mobile wireless data network. In particular, the system comprises redundantly configured resources including a set of active geo-redundant nodes (AGNs) and a set of standby geo-redundant nodes (SGNs). The system also includes a set of covered agents (CAs) that rely upon the redundantly configured resources to carry out data communications in the mobile wireless data network environment.

Furthermore, the system includes a geographic redundancy coverage issuer (GRCI). The GRCI includes a non-transitory computer readable medium and a processor that are configured to perform steps for managing the geo-redundant nodes of the mobile wireless network. The steps include maintaining a CA list identifying a set of subscribers to redundancy management services supported by the GRCI, maintaining an AGN list identifying a set of active geo-redundant nodes, and maintaining an SGN list identifying a set of standby geo-redundant nodes. Furthermore, the steps include providing the AGN list and the SGN list to subscriber CAs identified in the CA list. Moreover, in response to receiving a failure message, issued by a first CA identified in the set of subscribers enumerated in the CA list, identifying a failed AGN, the GRCI performs the further steps of: updating the AGN list to reflect a failed status for the failed AGN, and issuing one or more update messages to CAs in the CA list, the one or more update messages reflecting the failed status for the failed AGN and a transition of an activated SGN from the SGN list to the AGN list.

A method (and corresponding computer-readable medium including computer executable instructions) is also described that is carried out by the above-summarized system.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

The figures and associated written description provide illustrative examples of a system and method for carrying out geographic redundancy (geo-redundancy) for mobile wireless data network components (e.g., gateways between the mobile wireless infrastructure and a wide area network (e.g., the Internet). Geographic redundancy of mobile wireless data network components is supported and managed as a service by a geographic redundancy coverage issuer (GRCI). A covered agent (CA), for example a mobile wireless device but more generally any node capable of relying upon a redundantly configured resource, utilizes the services of the GRCI to receive access to information identifying geographic redundant (geo-redundant) configured network resources that are redundantly configured to cover a same geographic space.

As will be explained in detail herein below, the CAs subscribe to a designated (e.g., uniquely named) group. The group designation defines a scope of networked CA entities that are notified by the GRCI when a change occurs to the content of an active list and/or standby list defined for the group. Such changes include, for example, a change in status of a node from an active status to a failed status—resulting in removal of the node from the active list maintained by the GRCI for the group. In an illustrative example, the GRCI maintains a listing of all CAs associated with a group—thereby defining a scope of notifications when a node assigned to the group changes status. In an exemplary embodiment, the GRCI maintains information relating to geo-redundant configured mobile wireless data network components, including a set of geo-redundant configured mobile wireless data network components wherein each geo-redundant configured mobile wireless data network component is characterized by an active geo-redundant node (AGN) and a standby geo-redundant node (SGN). The AGNs are configured to operate primarily as the active partner of the geo-redundantly configured component. The SGNs are configured to operate primarily in a cold standby state. The cold standby state is characterized by SGNs not tracking active sessions for CAs using corresponding AGNs. In fact, the GRCI-managed geo-redundancy scheme requires no communications from the AGNs to corresponding SGNs while the AGNs are operating in a normal-active mode. In the illustrative examples provided herein, the AGN/SGN redundant pairs are mobile wireless data network gateways/routers providing connectivity to the Internet. Examples of such nodes include: packet data serving node (PDSN) and home agent (HA) node in CDMA networks, (SGSN) and (GGSN) in GPRS networks, and (SGW) and (PGW) nodes in LTE networks. However, the GRCI-managed redundancy functionality is potentially exploited by any redundant functional component of a mobile wireless data network. Furthermore, as will be apparent from the description of an illustrative example provided in FIG. 1, a geo-redundant node (AGN/SGN) may also be a CA.

Figure 1:
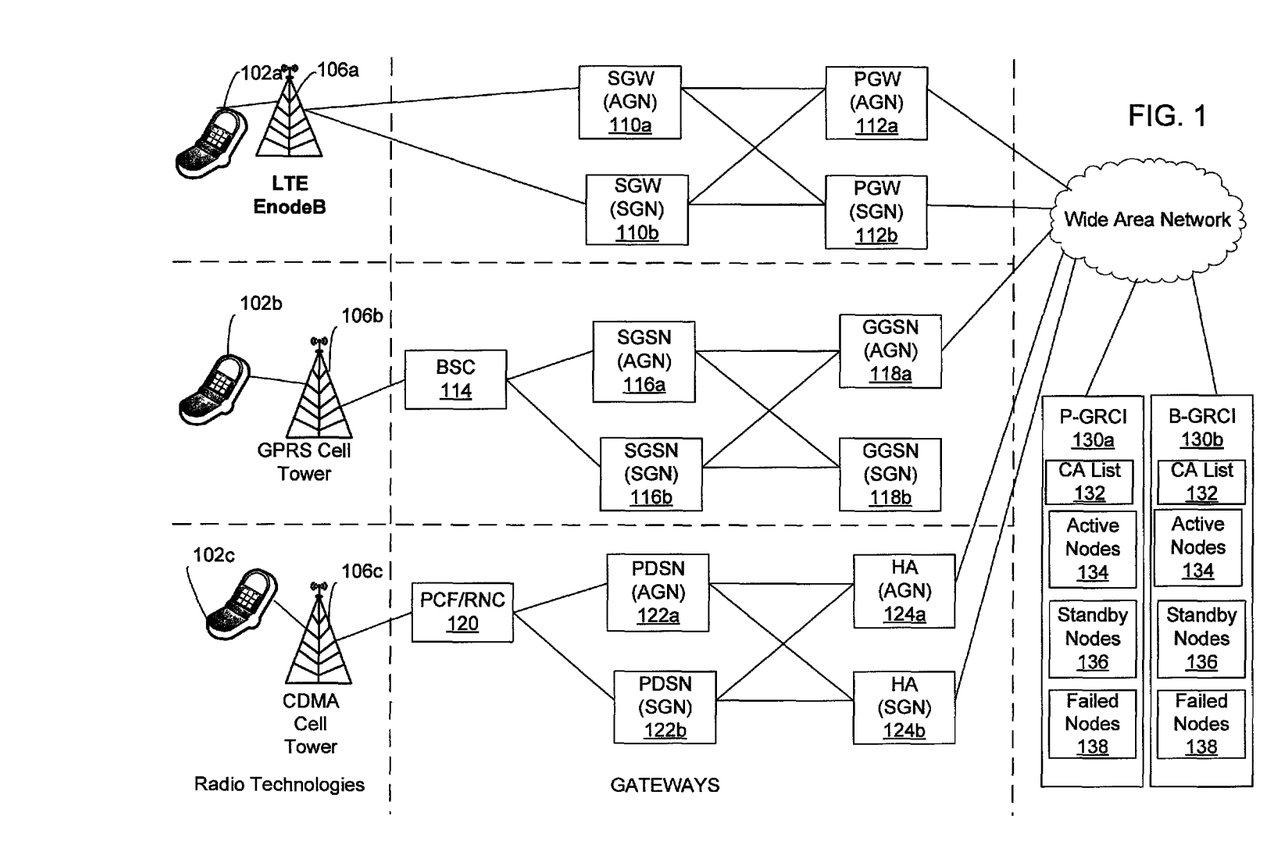
FIG. 1 is a schematic diagram illustrating a mobile wireless network environment interfacing a broadband digital data network to which a variety of application servers and a geo-redundancy coverage issuer (GRCI) are coupled and are accessed by mobile wireless devices in accordance with an embodiment of the invention.

Turning to FIG. 1, a substantially simplified network environment (for clarity while describing the functionality the illustrative geo-redundancy scheme herein) is schematically depicted that includes geo-redundant configured mobile wireless data network components (e.g., gateways) used by mobile devices 102a, 102b and 102c to access a variety of applications and information via a wide area network 104 (e.g., the Internet). As indicated in FIG. 1, the mobile devices 102a, 102b and 102c each access the wide area network 104 via a different radio technology. In particular, mobile device 102a utilizes an LTE EnodeB 106a, mobile device 102b utilizes a GPRS cell tower 106b, and mobile device 102c utilizes a CDMA cell tower 106c to gain access the wide area network 104 via corresponding gateway technologies.

FIG. 1 illustratively depicts a geo-redundant path between the mobile device 102a and the wide area network 104 for LTE technology. A first geo-redundant path segment is provided between the LTE EnodeB 106a and an active SGW geo-redundant node 110a and a standby SGW geo-redundant node 110b. A second geo-redundant path segment is provided between the active/standby SGW geo-redundant nodes 110a and 110b and an active PGW geo-redundant node 112a and a standby PGW geo-redundant node 112b. Each of the active/standby PGW geo-redundant nodes 112a and 112b provides a path to the wide area network 104.

With continued reference to FIG. 1, a geo-redundant path is provided between the mobile device 102b and the wide area network 104 for GPRS technology. The GPRS cell tower 106b is connected to a base station controller (BSC) 114. The BSC 114 is connected via a first geo-redundant path segment to an active SGSN geo-redundant node 116a and a standby SGSN geo-redundant node 116b. A second geo-redundant path segment is provided between the active/standby SGSN geo-redundant nodes 116a and 116b and an active GGSN geo-redundant node 118a and a standby GGSN geo-redundant node 118b. Each of the active/standby GGSN geo-redundant nodes 118a and 118b provides a path to the wide area network 104.

With further continued reference to FIG. 1, a geo-redundant path is provided between the mobile device 102c and the wide area network 104 for CDMA technology. The CDMA cell tower 106c is connected to a packet control function/radio network controller (PCF/RNC) 120. The PCF/RNC 120 is connected via a first geo-redundant path segment to an active PDSN geo-redundant node 122a and a standby PDSN geo-redundant node 122b. A second geo-redundant path segment is provided between the active/standby PDSN geo-redundant nodes 122a and 122b and an active home agent (HA) geo-redundant node 124a and a standby HA geo-redundant node 124b. Each of the active/standby HA geo-redundant nodes 124a and 124b provides a path to the wide area network 104.

In accordance with illustrative embodiments of the invention, a primary GRCI 130a and backup GRCI 130b pair provides geo-redundancy services for the covered agents (CAs), e.g., the mobile devices 102a, 102b and 102c, associated with each of the three depicted mobile wireless data network technologies (LTE, GPRS and CDMA). The primary GRCI 130a is backed up, in a more traditional sense using a hot (synchronized) standby configuration, by the backup GRCI 130b. Both the primary GRCI 130a and the backup GRCI 130b include, for each configured geo-redundant group, a synchronized copy of the following: a CA list 132, an active geo-redundant node list 134, a standby geo-redundant node list 136, and a failed active geo-redundant node list 138. Each of these structures is described herein below. The CA list 132 is used by the GRCI to notify registered CAs of any changes to the active geo-redundant node list 134 and the standby geo-redundant node list 136. The failed active geo-redundant node list 138 is maintained for purposes of taking remedial action with regard to a failed active geo-redundant node. Once restored to proper operation, the failed active geo-redundant node may be moved back to the active geo-redundant node list 134 (i.e., restored to active service of CAs) or alternatively placed in the standby geo-redundant node list 136.

The illustrative mobile wireless data network infrastructure/environment depicted in FIG. 1 is not intended to limit the invention with regard to alternative network topologies. Rather, it is intended to provide a visualization of the redundant configuration of network resources (e.g., gateways and routers) that are managed and coordinated by the primary GRCI 130a and backup GRCI 130b. In one particular aspect, the set of standby geo-redundancy nodes 110b, 112b, 116b, 118*b*, 122*b* and 124*b* depicted in FIG. 1 can be a group of multi-purpose standby nodes capable of taking over for a failed active geo-redundancy node. In this case, an SGN identified in a list of standby nodes for group, is not actually linked to a physical node until such time as the identified SGN needs to go active. In another embodiment, the physical nodes are grouped according to the type of AGN they are configured to replace. In both cases, a particular identified SGN is not assigned to a particular physical node until such time as the identified SGN needs to become active. This approach has the advantage of requiring fewer physical nodes to carry out the functionality of configured standby geo-redundant nodes. Thus, the standby functionality of the standby geo-redundancy nodes 110*b*, 112*b*, 116*b*, 118*b*, 122*b* and 124*b* depicted in FIG. 1 is carried out, for example, by a single appropriately configured physical network node (comprising one or more servers operating as a single network entity). The functionality and operation of the illustrative geo-redundantly supported network depicted in FIG. 1 is described herein below with reference to illustrative steps summarized in FIGS. 4, 5 and 6.

The illustrative embodiment depicted in FIG. 1 identifies three general mobile wireless radio technologies. However, the present invention is not limited to such environments and includes mobile wireless data networks using one or more mobile wireless technologies including: WCDMA, UMTS, GSM, GPRS, EDGE, Wi-Fi (i.e., IEEE 802.11x), Wi-MAX (i.e., IEEE 802.16), or similar telecommunication standards configured to deliver data services to mobile wireless devices. Furthermore, the example in FIG. 1 depicts smart mobile devices capable of initiating and using a mobile wireless data network connection. Examples of such devices include the following: a mobile phone, a PDA, or a mobile computer (e.g., a laptop, notebook, notepad or tablet) having mobile wireless capability.

Figure 2:
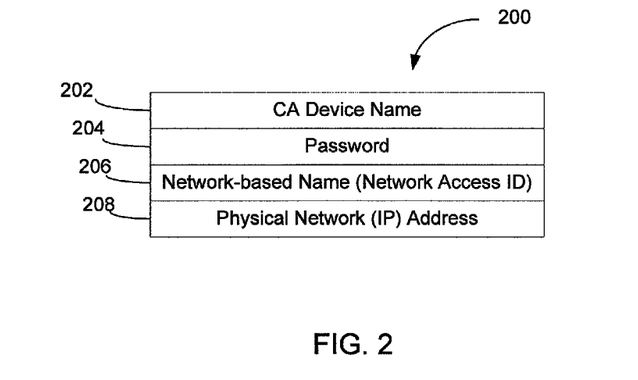
FIG. 2 summarizes fields for a portion of an exemplary covered agent list element maintained by the GRCI.

Turning briefly to FIG. 2, an exemplary list element 200 of the CA list 132 for a geo-redundancy group is provided. The CA list is maintained by the GRCI to facilitate notifying potentially affected CAs when any change occurs in an active or standby list for a group with which the listed CAs are associated. The exemplary list element 200 includes a unique CA device name 202 and a password 204 that together make up a set of credentials for the CA corresponding to the list element 200. The CA element also includes a network-based name 206, such as a network access identification (NAI). An example of a form of NAI is a userID/domain name combination (e.g., "user phone number"@domainx.com). The CA list element 200 also includes a physical network address 208 (e.g., IP address) used by the GRCI to send an updated list to the corresponding CA when either the standby or active group list (see, e.g., active list 134 and standby list 136 in FIG. 1) changes for the group with which the CA list element 200 is associated. In an exemplary embodiment, multiple groups are specified, and in such case, the GRCI maintains a separate list of CA elements for each group. Moreover, in an exemplary embodiment a global CA table is maintained, similar to the above-described CA list 132 for a group. However, the global CA table contains a compiled listing of all CAs for all groups maintained by a GRCI. In addition to the above-described fields of the list element 200, the global CA table elements include a list of groups to which a CA belongs.

Figure 3:
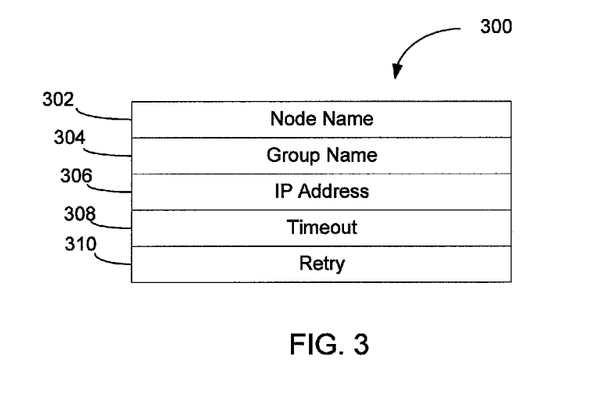
FIG. 3 summarizes fields for a portion of an exemplary list element for active geo-redundant nodes and standby geo-redundant nodes.

Turning to FIG. 3, an exemplary list entry structure in either of the active geo-redundant node list 134 and the standby geo-redundant node list 136 is provided. Information provided in each geo-redundant list element informs CAs (e.g., mobile devices 102*a*, 102*b* and 102*c*) of the presence of particular named geo-redundant configured network resources and the circumstances under which the particular active/standby geo-redundant node should be considered to be in a failed state. Additional information can be provided indicating the capabilities of the identified geo-redundant node within the active geo-redundant node list 134 and standby geo-redundant node list 136. A geo-redundant node list element 300 for a geo-redundant node includes a name field 302 uniquely identifying the geo-redundant node within a geo-redundant group identified in a geo-redundant group name field 304. An IP address field 306 includes information enabling a CA to initiate contact with the geo-redundant node. A time-out field 308 specifies a wait period for a CA to receive acknowledgment of a message to the geo-redundant node before resending the non-acknowledged message. A retry field 310 identifies a total number of times the CA will send/resend a particular message and not receive an acknowledgement from the geo-redundant node before registering the geo-redundant node as failed.

Figure 4:
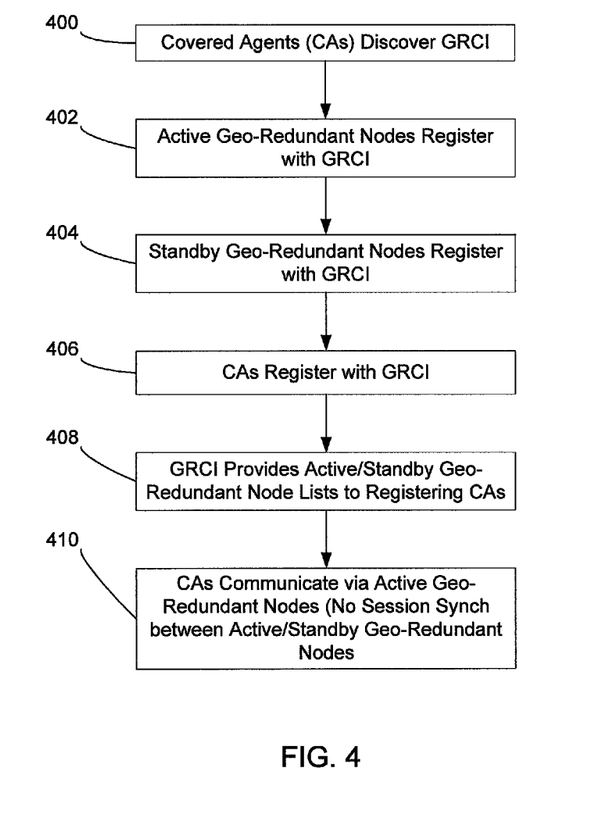
FIG. 4 is a flowchart summarizing set up and normal operation of a redundantly configured mobile wireless data network including a GRCI.
Figure 5:
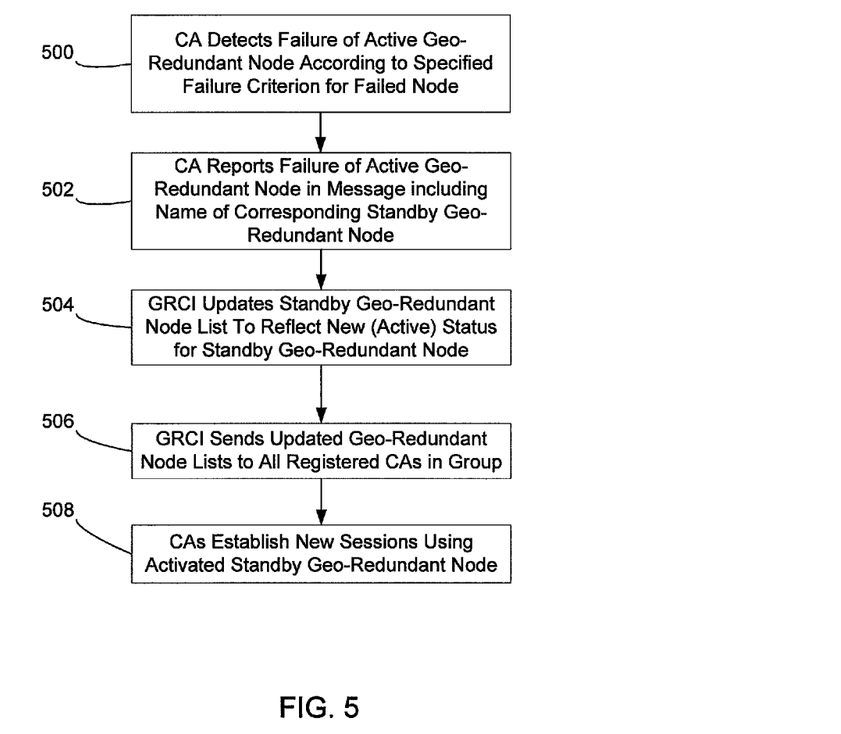
FIG. 5 is a flowchart summarizing a set of steps associated with failure of an active geo-redundant node in the redundantly configured mobile wireless data network including the GRCI.
Figure 6:
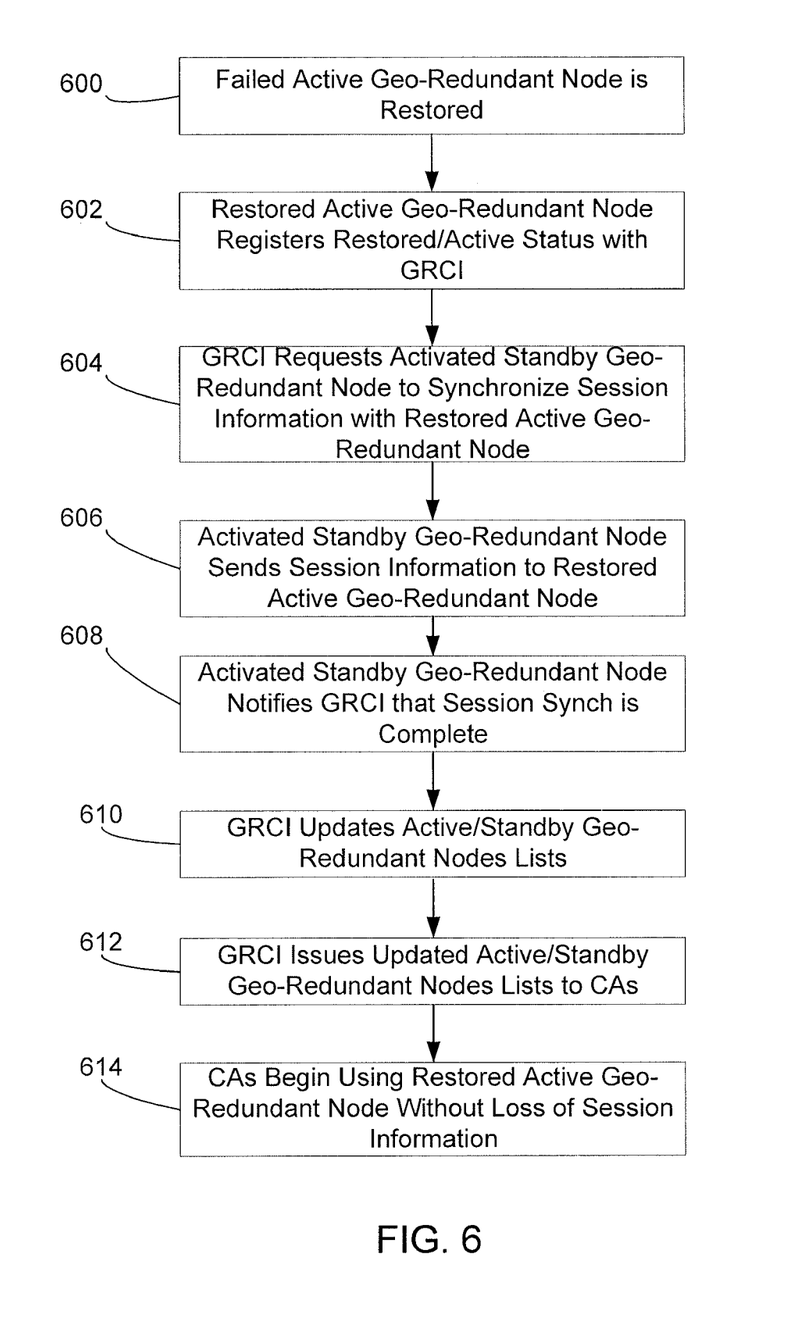
FIG. 6 is a flowchart summarizing a set of steps associated with restoring a previously failed active geo-redundant node to active status in the redundantly configured mobile wireless data network including the GRCI.

Having described an exemplary mobile wireless data network environment and data structures supporting a geographic redundancy scheme managed by a GRCI (e.g., GRCI 130*a*), attention is directed to FIGS. 4, 5 and 6 that summarize the operation of a geo-redundant configured network environment such as the one depicted in FIG. 1.

FIG. 4 summarizes steps relating to building the lists 132, 134 and 136 maintained by the primary/backup GRCIs 130*a* and 130*b*. During step 400, covered agents (CAs), such as mobile devices 102*a*, 102*b* and 102*c*, discover (e.g., are apprised of the existence and identifying information for) the GRCI 130*a*. In an exemplary embodiment, discovery occurs using DNS straightforward NAPTR (see, RFC 3958 for implementation details). However, a number of alternative discovery methods can be used including by manual configuration of relevant parameters for the GRCI 130*a*.

During step 402, active geo-redundant nodes, such as the active SGW 110*a*, are registered with the primary GRCI 130*a*. During registration, the information identified in FIG. 3 is specified for each active geo-redundant node. The information includes specifying a group name which identifies an affiliation with a group of registered CAs maintained in the CA list 132 of the primary GRCI 130*a*.

During step 404, active geo-redundant nodes, such as the standby SGW 110*b*, are registered with the primary GRCI 130*a*. During registration, the information identified in FIG. 3 is specified for each active geo-redundant node. The information includes specifying a group name which identifies an affiliation with a group of registered CAs maintained in the CA list 132 of the primary GRCI 130*a*.

It is noted that steps 400, 402, and 404 while presented sequentially, can occur in any order and multiple times during operation of the mobile wireless network (for multiple CAs, AGNs and SGNs).

During step 406, the CAs are registered with the primary GRCI 130*a* for a specified geo-redundant group identified, for example, by a unique group name used by all CAs, AGNs and SGNs affiliated with the specified geo-redundant group. The primary GRCI 130*a* maintains a list element (see e.g., FIG. 2) for each registered CA within the CA list 132.

During step 408, the GRCI 130*a* responds to a received CA registration request message by issuing a registration response including the name, time out and retry information for each data element in the active geo-redundant node list 134 and standby geo-redundant node list 136 having a same group name as a registering CA.

Thereafter, during step 410, the CAs communicate with the active geo-nodes in their group. In an illustrative embodiment, AGNs and corresponding SGNs do not synchronize active user session data. Thus, in the case of failure of an AGN, all session data currently maintained by the failed AGN is lost. The cold standby (i.e., no synchronization of active sessions between AGN and SGN) provides reasonable backup coverage for active node failures without the substantial communication costs associated with synchronization. It also allows a single backup server to assume the identity of multiple SGNs in cases where AGN failures are relatively rare.

Turning to FIG. 5, a series of steps summarize an AGN failure event and related operations to switch a corresponding SGN from standby to active status. During step 500, a CA (e.g., mobile device 102*a*) detects a failure of an AGN (e.g., active SGW 110*a*) associated with a particular group (e.g., Group-x) with which a set of CAs are registered. A geo-redundant node failure criterion is separately defined for each registered geo-redundant node by a combination of a timeout and a retry count specified in the active/standby geo-redundant node lists 134 and 136. The timeout and retry count define a criterion under which the affected CA switches to a designated standby geo-redundant node to report an active node failure to the GRCI.

During step 502, the CA (e.g., mobile device 102*a*) that detected the geo-redundant node (active SGW 110*a*) failure reports the failure in the form of a geo-redundant node failure message identifying the failed AGN to the primary GRCI 130*a*. In an exemplary embodiment, the responsibility of designating a particular named SGN (e.g., standby SGW 110*b*) for a failed AGN (e.g., active SGW 110*a*) is delegated to the CA (e.g., mobile device 102*a*) that detected the failure. Thus, the failure message issued by the CA also includes the unique name of the SGN for the failed AGN. Since the failed AGN cannot be used by the CA to communicate the failure message to the GRCI 130A, the CA sends the failure message via the SGN designated to take over for the failed AGN. By way of example, the standby geo-redundant node is specified by a domain-based name. When the active geo-redundant node fails, the domain-based name of the standby node is resolved by a naming service to a physical network (IP) address to enable the CA to re-establish a session that was lost due to failure of the AGN. Such arrangement (i.e., dynamic designation of a physical IP address for an identified SGN) facilitates using a number of physical standby nodes that are fewer in number than their active counterparts.

During step 504 the primary GRCI 130*a*, in response to receiving the failure message (or a pre-configured number of failure messages from one or more CA's identifying the failed AGN—a second level failure criterion implemented by the GRCI to filter out a transient AGN fault or CA-specific fault) for the failed AGN, updates the standby geo-redundancy node list 136 by moving the activated standby geo-redundant node (e.g., standby SGW 110*b*) from the standby geo-redundant node list 136 to the active geo-redundant node list 134. In addition, the failed geo-redundant node is moved from the active geo-redundant node list 134 to the failed AGN list 138.

During step 506, the primary GRCI 130*a* sends an update message to all CAs that are members of the group (Group-x) with which the failed geo-redundant node (e.g., active SGW 110*a*) is associated. The update includes both the updated active geo-redundant node list 134 and the updated standby geo-redundant node list 136. Alternatively, the GRCI issues a change message identifying only the changed elements of the active geo-redundant node list 134 and the standby geo-redundant node list 136. Importantly, the notification serves to inform all CAs within the group to use the activated SGN (now identified in the active geo-redundant node list 134) in place of the failed AGN. A desirable aspect of one contemplated embodiment is that the changed statuses of geo-redundant nodes is conveyed to affected CAs simply by sending updated versions of the active and standby geo-redundant node lists maintained by the GRCI for a group. It is noted that the activated SGN is used by the GRCI to send the updated versions of the geo-redundant node lists to CAs that previously used the failed AGN for routing data messages within the network.

During step 508 the CAs affected by the geo-redundant node changeover, from the failed AGN to the now activated SGN, establish new sessions via the activated SGN. The new sessions are necessitated by the cold standby mode of operation of the SGN (i.e., no session data synchronization) during normal operation of the corresponding AGN.

Turning to FIG. 6, a series of steps are summarized for handling recovery of a previously failed AGN and reestablishing the recovered AGN as the active geo-redundant node. During step 600, the failed AGN (e.g., active SGW 110*a*) is restored to service. Thereafter, during step 602 the restored AGN (e.g., active SGW 110*a*) is registered as an active geo-redundant node with the primary GRCI 130*a* to indicate that the restored AGN is now available to handle requests from CAs. At this point, the CAs, of the group to which the restored AGN is affiliated, are unaware of the availability of the restored (previously failed) AGN. In response, during step 604 the primary GRCI 130*a* issues a request to the currently active SGN (e.g., standby SGW 110*b* activated when active SGW 110*a* failed) to synchronize its session data for all CAs with the restored AGN (e.g., active SGW 110*a*). During step 606, the currently active SGN (e.g., standby SGW 110*b*) passes its session information to the restored AGN (e.g., active SGW 110*a*).

Upon completing synchronizing, during step 608 a synchronization complete message is provided to the GRCI 130*a*. In an illustrative embodiment, the synchronization complete message is issued by the currently active SGN (e.g., standby SGW 110*b*) on behalf of the restored AGN (e.g., active SGW 110*a*).

In response to receiving the synchronization complete message, during step 610 the primary GRCI 130*a* updates both the active geo-redundant node list 134 and the standby geo-redundant node list 136 to reflect the updated status of the restored AGN and the previously activated SGN (to be returned to standby status).

During step 612, the primary GRCI 130*a* sends the updated AGN and SGN list information to each CA that is a member of the group (e.g., Group-x) to which the restored AGN belongs. During step 614 all effected CAs (e.g., mobile device 102*a*) commence, without loss of existing session information, using the fully synchronized and restored SGN (e.g., active SGW 110*a*).

All references, including publications, patent applications, and patents, cited herein are hereby incorporated by reference to the same extent as if each reference was individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for managing geo-redundant configured resources in a mobile wireless data network environment including a geographic redundancy coverage issuer (GRCI), redundantly configured resources, operating on network nodes distinct from a GRCI node, provided in the form of a set of active geo-redundant nodes (AGNs) and a set of standby geo-redundant nodes (SGNs), and a set of covered agents (CAs) that rely upon the redundantly configured resources for carrying out data communications in the mobile wireless data network environment, the method comprising the steps of:
   maintaining, by the GRCI, a CA list identifying a set of subscribers to redundancy management services supported by the GRCI;
   maintaining, by the GRCI, an AGN list identifying a set of active geo-redundant nodes;
   maintaining, by the GRCI, an SGN list identifying a set of standby geo-redundant nodes;
   providing, by the GRCI, the AGN list and the SGN list to subscriber CAs identified in the CA list;
   receiving, by the GRCI, a failure message, issued by a first CA identified in the set of subscribers enumerated in the CA list, and wherein the failure message identifies a failed AGN; and
   in association with receiving notification of the failure message, performing the further steps of:
      updating, by the GRCI, the AGN list to reflect a failed status for the failed AGN, and
      issuing, by the GRCI, one or more update messages to CAs in the CA list, the one or more update messages reflecting the failed status for the failed AGN and a transition of an activated SGN from the SGN list to the AGN list.

2. The method of claim 1 wherein the AGN list and SGN list elements are administered by the GRCI as a group such that the GRCI issues an update message to CAs, in the CA list affiliated with the group, when an element within either one of the AGN list and SGN list changes status.

3. The method of claim 1 wherein the update messages include a complete listing of each element of the AGN list and SGN list.

4. The method of claim 3 wherein the update messages include, for each element of the AGN list, a specified timeout and retry count applied by CAs to determine whether an AGN has failed.

5. The method of claim 1 wherein the failure message is received by the GRCI via an SGN designated for the failed AGN.

6. The method of claim 1 further comprising maintaining, by the GRCI, a failed AGN list containing a list of geo-redundant nodes identified in failure messages received by the GRCI from CAs.

7. The method of claim 1 further comprising:
   receiving, by the GRCI, a registration message from the failed AGN indicating the failed AGN is restored and ready for active status;
   issuing, by the GRCI, a synchronize message to the activated SGN requesting the activated SGN to synchronized session information with the failed AGN that is now restored;
   receiving a synchronization complete message in response to the issuing a synchronization message, and in response the GRCI performs the further steps of:
      updating the AGN list to reflect an active status for the now restored, previously failed, AGN, and
      issuing one or more update messages to CAs in the CA list, the one or more update messages reflecting the active status for the restored AGN and a transition of the activated SGN from the AGN list to the SGN list.

8. The method of claim 1 further comprising:
   maintaining a second GRCI configured as a standby GRCI, the second GRCI including at least a synchronized copy of the CA list, the AGN list, and the SGN list.

9. A system for managing geo-redundant configured resources in a mobile wireless data network environment comprising:
   redundantly configured resources comprising:
      a set of active geo-redundant nodes (AGNs), and
      a set of standby geo-redundant nodes (SGNs);
   a set of covered agents (CAs) that rely upon the redundantly configured resources for carrying out data communications in the mobile wireless data network environment; and
   a geographic redundancy coverage issuer (GRCI), operating on a GRCI node distinct from the set of AGNs and the set of SGNs, the GRCI node including a non-transitory computer readable medium and a processor configured to perform the steps of:
      maintaining a CA list identifying a set of subscribers to redundancy management services supported by the GRCI;
      maintaining an AGN list identifying a set of active geo-redundant nodes;
      maintaining an SGN list identifying a set of standby geo-redundant nodes;
      providing the AGN list and the SGN list to subscriber CAs identified in the CA list;
      receiving a failure message, issued by a first CA identified in the set of subscribers enumerated in the CA list, and wherein the failure message identifies a failed AGN; and
      in association with receiving notification of the failure message, performing the further steps of:
         updating the AGN list to reflect a failed status for the failed AGN, and
         issuing one or more update messages to CAs in the CA list, the one or more update messages reflecting the failed status for the failed AGN and a transition of an activated SGN from the SGN list to the AGN list.

10. The system of claim 9 wherein the GRCI is configured to administer the AGN list and SGN list elements as a group such that the GRCI issues an update message to CAs, in the CA list affiliated with the group, when an element within either one of the AGN list and SGN list changes status.

11. The system of claim 9 wherein the update messages include a complete listing of each element of the AGN list and SGN list.

12. The system of claim 10 wherein the update messages include, for each element of the AGN list, a specified timeout and retry count applied by CAs to determine whether an AGN has failed.

13. The system of claim 9 wherein the failure message is received by the GRCI via an SGN designated for the failed AGN.

14. The system of claim 9 further comprising maintaining, by the GRCI, a failed AGN list containing a list of geo-redundant nodes identified in failure messages received by the GRCI from CAs.

15. The system of claim 9 wherein the GRCI is further configured to perform the steps of:
receiving a registration message from the failed AGN indicating the failed AGN is restored and ready for active status;
issuing a synchronize message to the activated SGN requesting the activated SGN to synchronized session information with the failed AGN that is now restored;
receiving a synchronization complete message in response to the issuing a synchronization message, and in response performing the further steps of:
updating the AGN list to reflect an active status for the now restored, previously failed, AGN, and
issuing one or more update messages to CAs in the CA list, the one or more update messages reflecting the active status for the restored AGN and a transition of the activated SGN from the AGN list to the SGN list.

16. The system of claim 9 further comprising:
a second GRCI configured as a standby GRCI, the second GRCI including at least a synchronized copy of the CA list, the AGN list, and the SGN list.

17. A non-transitory computer-readable medium including computer-executable instructions for managing geo-redundant configured resources in a mobile wireless data network environment including a geographic redundancy coverage issuer (GRCI), redundantly configured resources, operating on network nodes distinct from a GRCI node, provided in the form of a set of active geo-redundant nodes (AGNs) and a set of standby geo-redundant nodes (SGNs), and a set of covered agents (CAs) that rely upon the redundantly configured resources for carrying out data communications in the mobile wireless data network environment, the computer-executable instructions facilitating performing the steps of:
maintaining, by the GRCI, a CA list identifying a set of subscribers to redundancy management services supported by the GRCI;
maintaining, by the GRCI, an AGN list identifying a set of active geo-redundant nodes;
maintaining, by the GRCI, an SGN list identifying a set of standby geo-redundant nodes;
providing, by the GRCI, the AGN list and the SGN list to subscriber CAs identified in the CA list;
receiving, by the GRCI, a failure message, issued by a first CA identified in the set of subscribers enumerated in the CA list, and wherein the failure message identifies a failed AGN; and
in association with receiving notification of the failure message, performing the further steps of:
updating, by the GRCI, the AGN list to reflect a failed status for the failed AGN, and
issuing, by the GRCI, one or more update messages to CAs in the CA list, the one or more update messages reflecting the failed status for the failed AGN and a transition of an activated SGN from the SGN list to the AGN list.

18. The non-transitory computer readable medium of claim 17 wherein the AGN list and SGN list elements are administered by the GRCI as a group such that the GRCI issues an update message to CAs, in the CA list affiliated with the group, when an element within either one of the AGN list and SGN list changes status.

19. The non-transitory computer readable medium of claim 17 wherein the update messages include a complete listing of each element of the AGN list and SGN list.

20. The non-transitory computer readable medium of claim 19 wherein the update messages include, for each element of the AGN list, a specified timeout and retry count applied by CAs to determine whether an AGN has failed.

21. The non-transitory computer readable medium of claim 17 wherein the GRCI is configured to receive the failure message via an SGN designated for the failed AGN.

22. The non-transitory computer readable medium of claim 17 further comprising computer executable instructions for maintaining a failed AGN list containing a list of geo-redundant nodes identified in failure messages received by the GRCI from CAs.

23. The non-transitory computer readable medium of claim 17 further comprising computer executable instructions for performing the steps of:
receiving, by the GRCI, a registration message from the failed AGN indicating the failed AGN is restored and ready for active status;
issuing, by the GRCI, a synchronize message to the activated SGN requesting the activated SGN to synchronized session information with the failed AGN that is now restored;
receiving a synchronization complete message in response to the issuing a synchronization message, and in response the GRCI performs the further steps of:
updating the AGN list to reflect an active status for the now restored, previously failed, AGN, and
issuing one or more update messages to CAs in the CA list, the one or more update messages reflecting the active status for the restored AGN and a transition of the activated SGN from the AGN list to the SGN list.

24. The non-transitory computer readable medium of claim 17 further comprising computer executable instructions for performing the steps of:
maintaining a second GRCI configured as a standby GRCI, the second GRCI including at least a synchronized copy of the CA list, the AGN list, and the SGN list.

* * * * *